United States Patent
Percival et al.

(10) Patent No.: US 7,330,851 B2
(45) Date of Patent: Feb. 12, 2008

(54) DATA SECURITY THROUGH DISSEMBLY OF DATA ELEMENTS OR CONNECTIONS BETWEEN ELEMENTS

(75) Inventors: Marvin Percival, Andover, MA (US); William C. Tice, Georgetown, MA (US)

(73) Assignee: Eaglehawk, Limited (BM)

( * ) Notice: Subject to any disclaimer, the term of this patent is extended or adjusted under 35 U.S.C. 154(b) by 378 days.

(21) Appl. No.: 10/920,034

(22) Filed: Aug. 17, 2004

(65) Prior Publication Data

US 2005/0080827 A1    Apr. 14, 2005

Related U.S. Application Data

(60) Provisional application No. 60/496,090, filed on Aug. 18, 2003.

(51) Int. Cl.
  *G06F 17/30* (2006.01)
(52) U.S. Cl. ........................................ 707/9; 707/103 R
(58) Field of Classification Search ..................... None
  See application file for complete search history.

(56) References Cited

U.S. PATENT DOCUMENTS

| | | | |
|---|---|---|---|
| 7,103,915 B2* | 9/2006 | Redlich et al. | 726/27 |
| 2002/0091734 A1 | 7/2002 | Redlich et al. | |
| 2002/0129047 A1* | 9/2002 | Cane et al. | 707/204 |
| 2003/0154386 A1 | 8/2003 | Wittkotter | |
| 2005/0132070 A1 | 6/2005 | Redlich et al. | |

OTHER PUBLICATIONS

Kher et al. Securing distributed storage: challenge, techniques, and systems, Workshop On storage Security And Survivability, Proceedings of the 2005 ACM workshop on Storage security and survivability, pp. 9-25, 2005.*

Landwehr et al. A taxonomy of computer program security flaws, ACM Computing Surveys, vol. 26, Issue 3, pp. 211-254, Sep. 2005.*

Yamada et al. A Multicast Tree Reconstruction Method for Many-to-Many Mobile Communications with Delay Contraint, Local Computer Networks, Proceeding 2006 31st IEEE Conference, pp. 525-526, Nov. 2006.*

Bhutta et al. On Combining Encryption for Multiple Data Streams, 9th International Conference, IEEE INMIC 2005, pp. 1-6, Dec. 2005.*

* cited by examiner

*Primary Examiner*—John E Breene
*Assistant Examiner*—Baoquoc N. To
(74) *Attorney, Agent, or Firm*—Hamilton, Brook, Smith & Reynolds, PC (57) ABSTRACT

A technique for providing data security through the removal of elements of a database table, be they the data fields themselves, or structural components, such as connection information that defines how, for example, the elements of a database are structured. The removed elements are placed in a secure location, retrievable only by having knowledge of a new primary key stored with the removed elements.

32 Claims, 12 Drawing Sheets

| Table | |
|---|---|
| Primary Key – PK – value = 1234 | |
| Field One – value = AAAA | |
| Field Two – value = BBBB | |
| Field Three – value = CCCC | |
| Etc. | |

Fig. 4.

| Table | |
|---|---|
| New Primary Key – NPK – value = X4S7 | |
| Primary Key – PK – 1234 | |
| Field One – value = AAAA | |
| Field Two – value = BBBB | |
| Field Three – value = CCCC | |
| Etc | |

500 (table), 510 (header row)

| Table |
|---|
| New Primary Key – NPK – value = X4S7 |
| Primary Key – PK – 1234 |
| Field One – value = AAAA |
| Field Two – value = *NULL* |
| Field Three – value = CCCC |
| Etc |

DATA SECURITY THROUGH DISSEMBLY OF DATA ELEMENTS OR CONNECTIONS BETWEEN ELEMENTS

RELATED APPLICATIONS

This application claims the benefit of U.S. Provisional Application No. 60/496,090, filed Aug. 18, 2003. The entire teachings of the above application are incorporated herein by reference.

BACKGROUND OF THE INVENTION

The problem of protecting an organization's sensitive data from access by unauthorized users is an increasingly important issue for essentially all businesses, government and agency organizations, as well as consumers. In response to the problem of unauthorized access, organizations often adopt a multi-layered approach to security, using some combination of perimeter systems (e.g., firewalls or authentication) and encryption technologies designed to mathematically encode data within a database.

Unfortunately, years of experience have demonstrated that even the most sophisticated perimeter and encryption technologies can be penetrated by determined attackers, with incidents of such vulnerabilities being both continuous and well-documented. Once such penetration occurs, unauthorized access has been gained to the actual data being protected, and the confidentiality of this data is at risk.

SUMMARY OF THE INVENTION

The present invention involves the concept of providing data security through the removal of elements of a data store, whether they be the data fields themselves or structural components, such as connection information that defines how the tables of a database are related. The removed elements are placed in a secure remote location, retrievable only by those having authenticated permission to access the removed information.

In the case of data element removal, individual data elements are removed from the database tables and secured via access control mechanisms. As determined by the access control mechanisms, the removed elements are then accessible only by authorized users.

The database structure is disassembled into discrete tables by removing the linkages that bind the database tables together and securing the linkages via access control mechanisms. The individual tables of the database structure are then stored as separate, unrelated tables on either the same, or different, computers. Then, as determined by the access control mechanisms, the linkages are retrieved and employed to reassemble data from the individual database tables for authorized users.

The method may involve assigning new primary keys and/or linkage fields to the table to allow for secure retrieval of the removed data elements and their association with the appropriate table data elements.

The invention has advantages over techniques that remove data elements but then rely simply on encryption and/or access control for security. Specifically, the present invention depends on deconstruction, removal of elements (data elements or structural elements), and inserting a new primary key. The present invention can still utilize encryption in the data tables that have elements removed or in the secure location where removed elements are stored, but the invention is not dependent on the use of such encryption to achieve data security.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

In general, determined attackers can and will penetrate perimeter security (e.g., firewalls) and encryption technologies. Thus, sensitive data that resides in a database protected only by these techniques is potentially at risk to unauthorized access.

Figure 1:
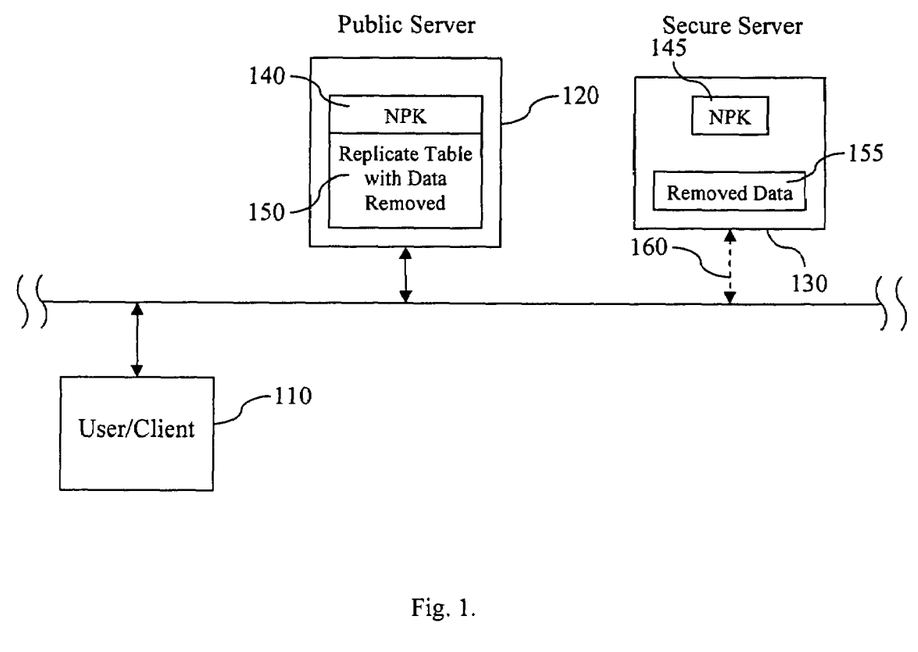
FIG. 1 is a block diagram of a network in which the present invention may be employed.

FIG. 1 shows a network in which the present invention may be employed. A user/client 110 can access a public server 120 containing database tables. An authorized user/client 110 can further access a secure server 130 via secure network connections 160.

To understand a first aspect of the present invention, consider the structure of a typical relational database. In such a structure, data elements reside in rows and columns. Each row contains the potential for multiple fields, with each field in the row being a separate column. Within this structure, if data contained in a field, row, column, or table is corrupted or removed, that data is no longer available for access in the table.

To that end, the present invention provides security by preventing unauthorized access to sensitive data through the removal of certain elements from the database. In such an instance, even a successful attacker cannot access data that is no longer there. In addition, the removal process occurs in such a way as to enable the programmatic reconstruction of the database for authorized users.

Programmatic removal and relocation of a data element from a table to a separate, secure location having memory of the original location of the removed element in a database table allows for, first, security of the removed data element and, second, programmatic reconstruction of the removed data element to the database table.

In a first embodiment, the invention can be carried out by a data processing system that is adapted for relational database processing. Such a system may include an appropriately programmed data processor with associated secure storage 130 that is accessible via secure network connections 160.

Figure 2:
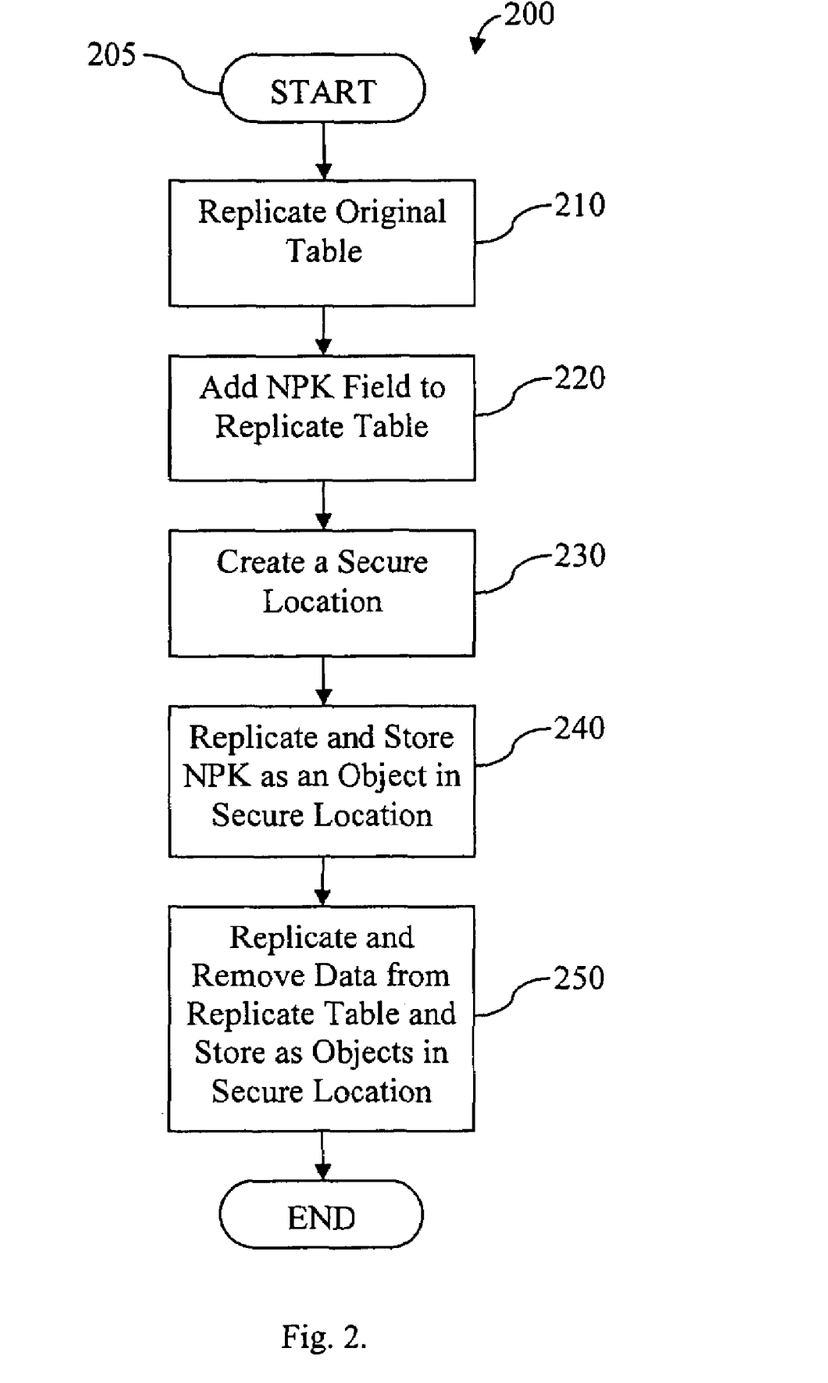
FIG. 2 is a flow diagram of a process to remove and secure an element from the replicate table.
Figure 4:
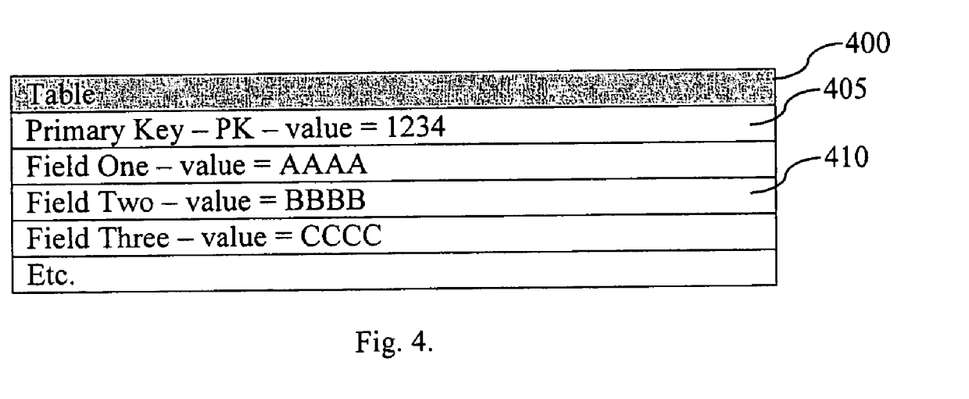
FIG. 4 is a diagram of the original or replicate table.

A method that secures data through element removal proceeds as a sequence of processing steps shown in the flowchart in FIG. 2. The method begins in step 205. In step 210, the original table is replicated to produce a replicate table 400 shown in FIG. 4. The replicate table 400 (and the original table) consists of a Primary Key 405 field and any number of fields for data such as Field Two 410. All of the data in the replicate table (and original table) is available for retrieval. However, if the data in Field Two 410 is corrupted, such as by its complete removal, it is no longer available for retrieval and the table is of limited value to someone who accesses it.

Figure 5:
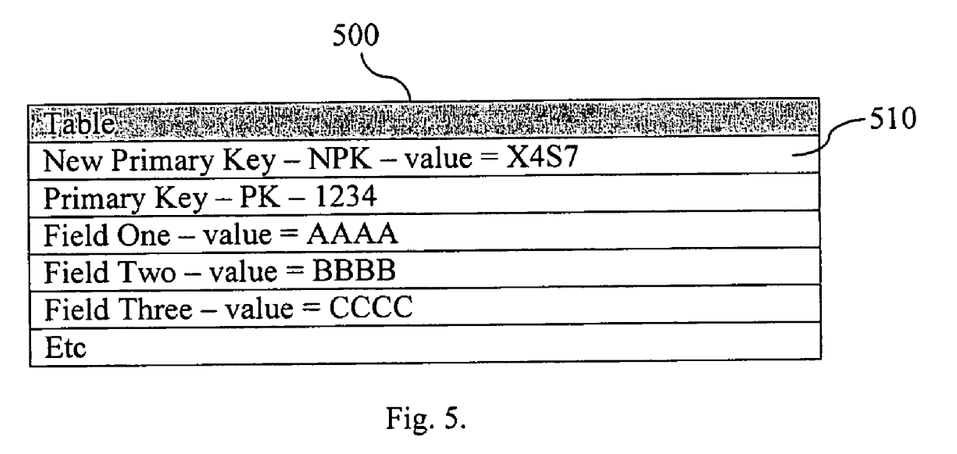
FIG. 5 is a diagram of the replicate table with the new primary key field.

To reach that result, in step 220, a new primary key (NPK) field is added to the replicate table, with the NPK value having no relationship to the original table data (such an NPK value can be generated randomly or in other ways). The resulting table is shown in FIG. 5 where the NPK field 510 has a value, for example, of X4S7.

In step 230, a secure location is created for the storage of objects removed from the replicate table. The secure location should be separate from the originating database containing the table data to be removed, and is ideally an object oriented data environment with very strong access control attributes. An example of an object oriented database suitable for this repository would be the StrongBox™ product available from Eaglehawk Limited or the ObjectStore® product available from Progress Software. Alternatively, the secure location could be a relational or other database type, utilizing very strong access control and possibly encryption of data.

Figure 7:
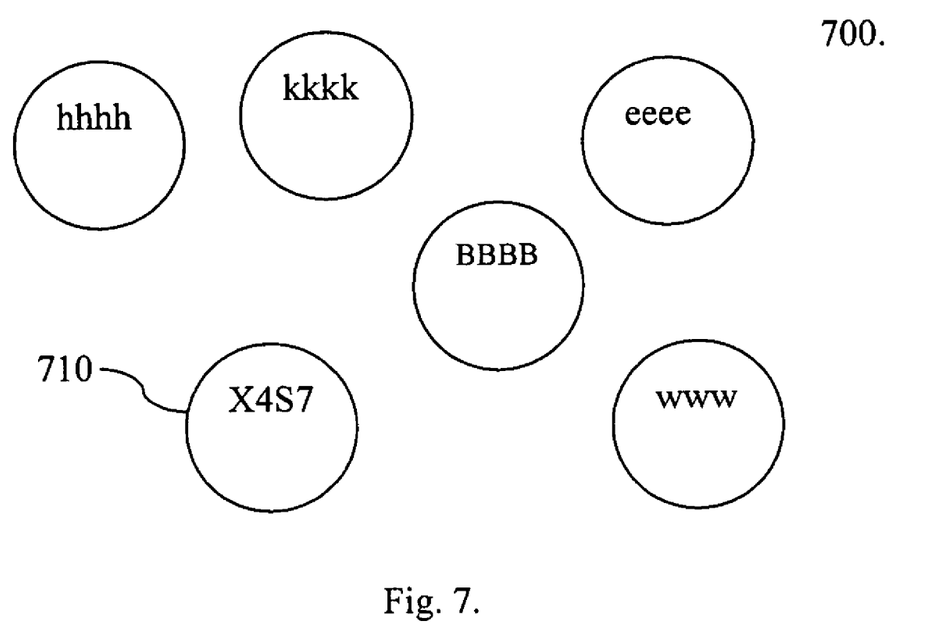
FIG. 7 is a diagram of the secure location where the replicate new primary key and the removed element are stored.

Next, in step 240, the New Primary Key is replicated and stored into the secure location as an individual object. FIG. 7 shows a secure location 700 where the NPK value 710 is stored.

Figure 6:
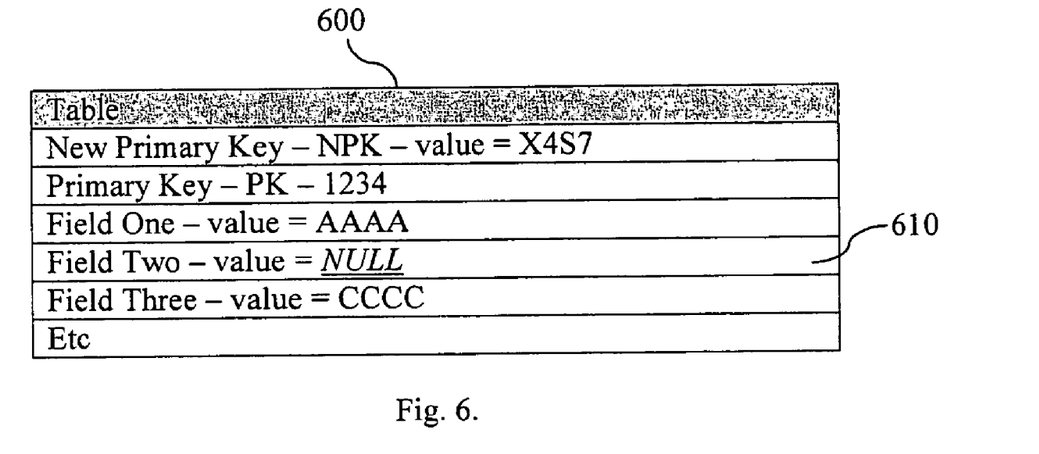
FIG. 6 is a diagram of the replicate table with the new primary key field and a data field removed.

Finally, in step 250, (user specified) data from the replicate table is replicated, removed, and stored as objects in the secure location. For example, FIG. 6 shows a replicate table 600 with the data from Field Two 610 removed leaving a NULL or specious value. As illustrated in FIG. 7, the removed data (BBBB) is stored as an object in the secure location 700. In the end, the contents of the secure location 700 will appear as a disjointed set of values to an unauthorized user. The removed data of the replicate table is thus replicated in the secure location, ensuring that no obvious relationship exists with the NPK value to a user who does not have appropriate access rights. The original table can then be deleted or removed from user access.

Figure 3:
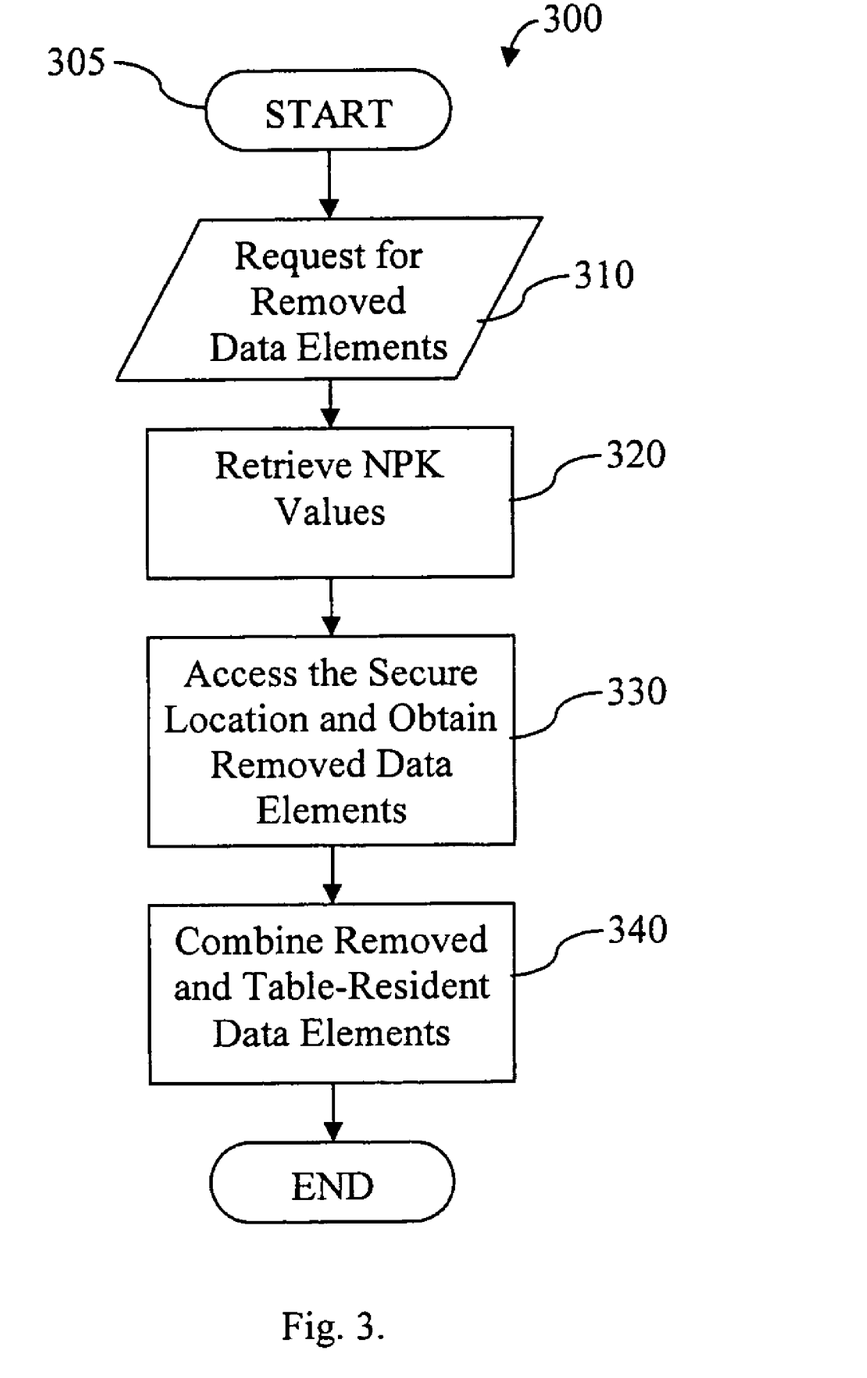
FIG. 3 is a flow diagram of a process to reconstruct the replicate table.

When a user or client needs access to the replicate table data including the removed data elements the flowchart steps shown in FIG. 3 are followed. The method begins in step 305. In step 310, an authorized user or client makes a reconstruction request for removed and/or table-resident data elements. Any table-resident elements are processed based on selection criteria of the request. In step 320, NPK values of rows meeting the selection criteria are retrieved. In step 330, the secure location is accessed using retrieved NPK values and removed data elements are located and processed according to selection criteria applying to the NPK of these data objects. Finally, in step 340, using matching NPK values, the previously removed and table-resident data elements meeting selection criteria of the request are combined.

Figure 9:
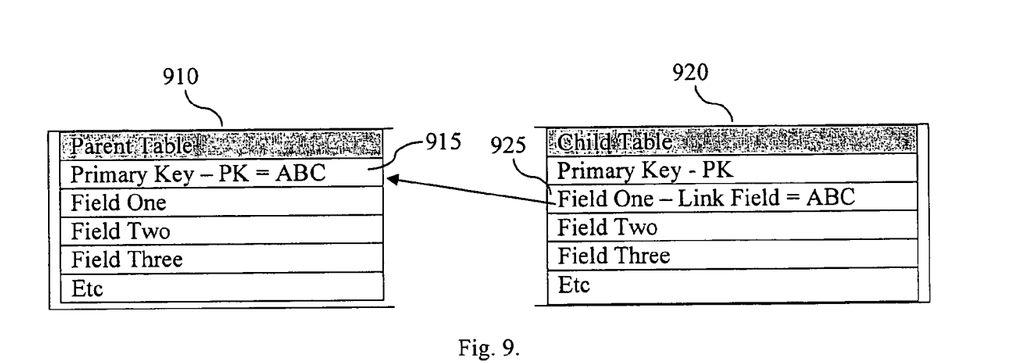
FIG. 9 is a diagram of original or replicate parent and child tables linked together.

A second important aspect of the present invention relates to the fact that in a traditional relational database structure separate data tables can be, and typically are, connected using parent-child relationships. Each such table must have a primary key (PK) field. A row in each child table must have a field with a value matching the value of its parent row in the parent table PK field. For example, in FIG. 9, a child table 920 has a value in Field One 925 matching the value in the PK field 915 of a parent table 910.

However, if the parent table PK field in such a structure is corrupted or removed, the child table is no longer able to relate to the parent table. As such, a secure method for storing the table can be provided through programmatic removal and relocation of a parent table PK to a secure location. As described above, this allows for, first, security through the inability of the child table to relate to the parent table and, second, programmatic reestablishment of the parent/child relationship.

Figure 8:
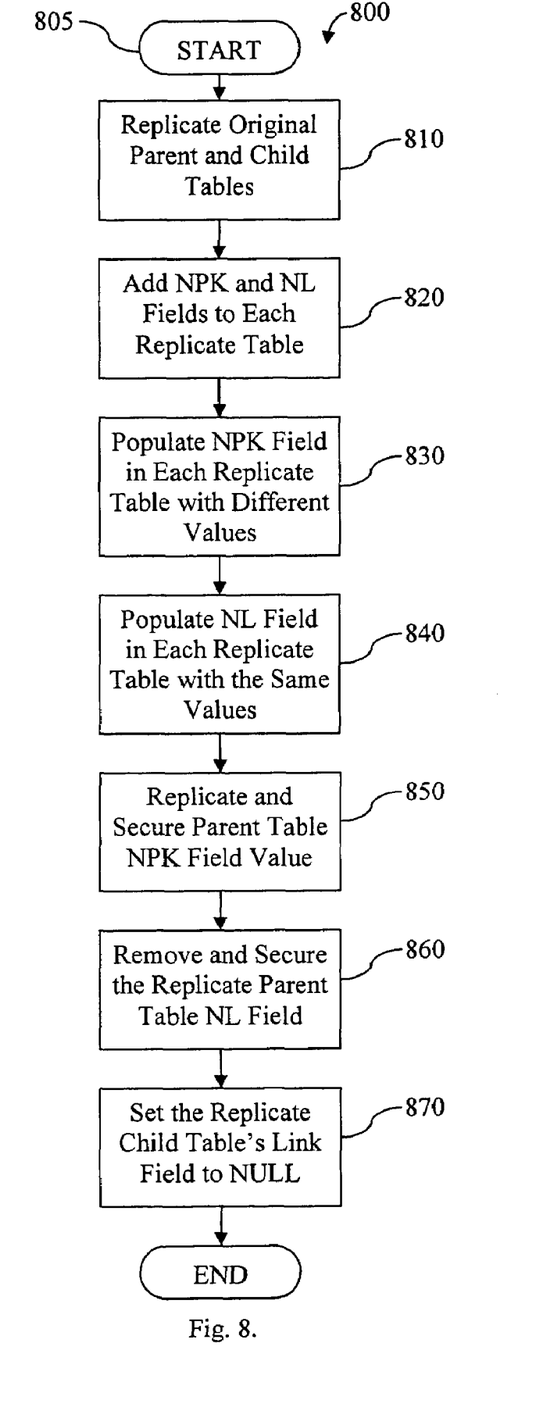
FIG. 8 is a flow diagram of a process to secure the link between replicate tables.
Figure 10:
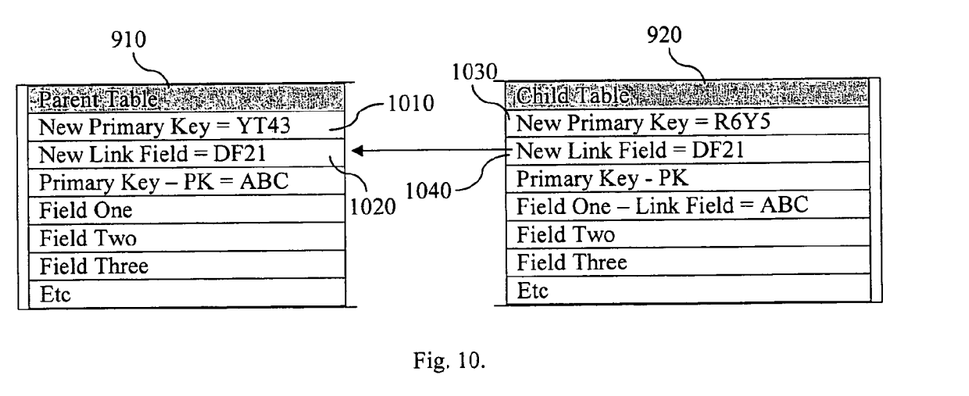
FIG. 10 is a diagram of the replicate parent and child tables with new primary keys and new link fields.

In one embodiment, the invention can secure the contents of a structural table by the processing steps shown in FIG. 8. The process begins in step 805. In step 810, the original parent and child data tables are replicated producing replicate parent and child tables. In step 820, two fields are added to each replicate table: a New Primary Key (NPK) field and a New Linking (NL) field. FIG. 10 illustrates the addition of these new fields in the replicate parent table 910 and the replicate child table 920. In step 830, the NPK field in the replicate parent and child tables are populated with different values having no relationship to the original data. For example, in FIG. 10, the NPK field 1030 of the child table 920 has a different value than the value of the NPK field 1010 of the parent table 910.

In step 840, the NL field in the parent and child replicate tables are populated with the same values, but again, having no relationship to the original data. For example, in FIG. 10, the NL field 1040 of the child table 920 has the same value as the NL field 1020 of its parent row in the parent table 910.

In step 850, the NPK field value from the Parent Table is replicated and stored in a secure location.

In the remaining steps the data structure is secured by disconnecting the replicate parent and child tables. First, in step 860, the replicate parent table NL field is removed, secured in a secure location, and set to NULL. Then, in step 870, the replicate child table field matching the replicate parent table PK is set to NULL.

Figure 11:
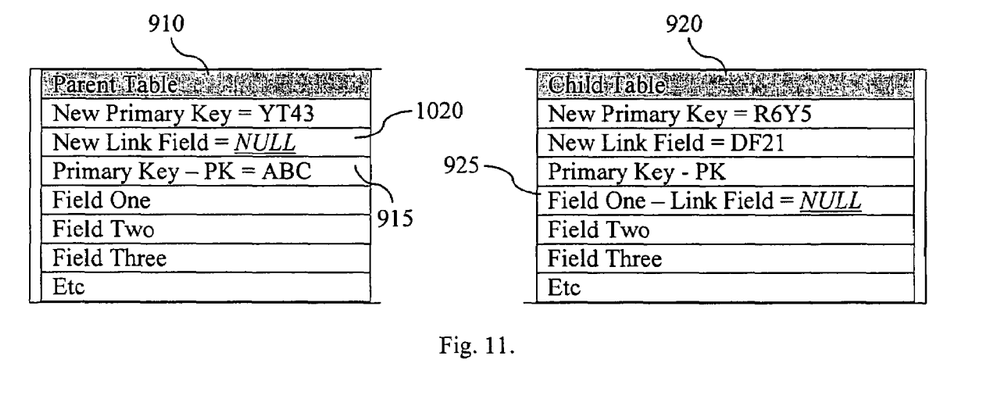
FIG. 11 is a diagram of the parent table with the new link field removed and the child table with the link field removed.
Figure 12:
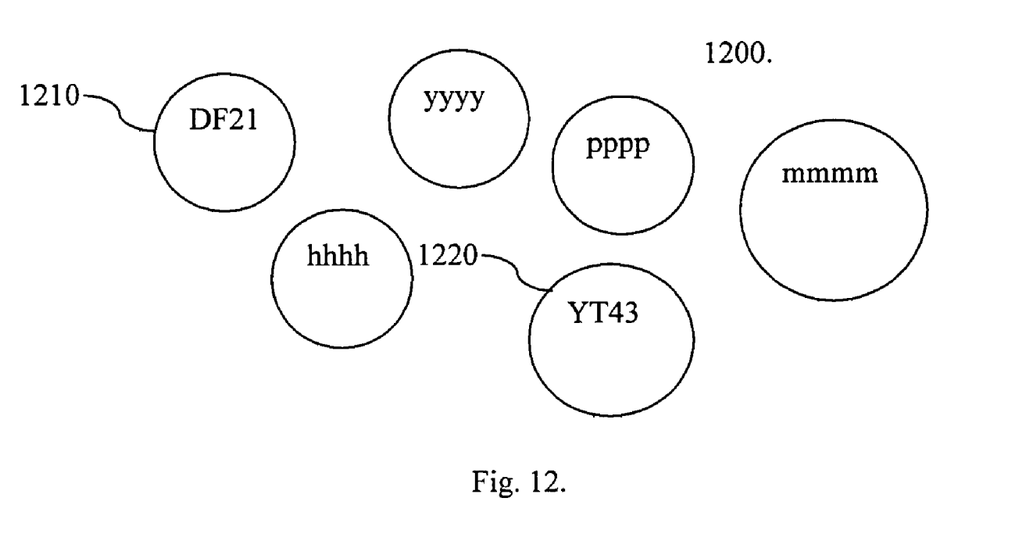
FIG. 12 is a diagram of the secure location where the removed link fields are stored.

At the end of this process, the replicate parent and child tables appear as they do in FIG. 11 with the NL field 1020 in the Parent Table 910 set to NULL and Field One 925 in the Child Table 920 set to NULL. FIG. 12 illustrates the secure location 1200 at this point containing the replicate NPK value of the Parent Table 1220 and the NL field value of the replicate parent and child tables 1210.

The data structure is then reestablished by reconstructing the parent/child relationship. A method of the secure location when supplied with the replicate parent table NPK will return the replicate child table NL, thus providing the ability to reestablish the relationship between tables. Similarly, a method of the secure location when supplied with the child table NL will return the replicate parent table NPK, thus providing the ability to reestablish the relationship between tables.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for providing data security comprising the steps of:
    identifying an original table having a primary key and multiple data fields; replicating the original table in a replicate table;
    adding a new primary key and a link field to the replicate table;
    removing an element from the replicate table; and
    storing the element removed in a secure location, with no direct linkage between the new primary key and the element removed from the replicate table;
    requesting the new primary key;
    retrieving the new primary key associated with the element stored in the secure location;
    presenting the new primary key and the link field to the secure location to retrieve the element stored in the secure location; and
    combining the element, stored in the secure location, with the replicate table.

2. A method as in claim 1 wherein the original table resides in a database structure.

3. A method as in claim 1 wherein the removed elements are data fields.

4. A method as in claim 3 wherein the removed elements comprise link information.

5. A method as in claim 1 wherein the secure location is an object oriented database with access control attributes.

6. A method as in claim 1 wherein the data elements in the secure location appear as a disjointed set of values.

7. A method as in claim 1 wherein the replicate table is stored in the secure location.

8. A method as in claim 1 wherein the replicate table is stored in a remote location.

9. A method as in claim 1 wherein the replicate table with elements removed is generally accessible.

10. A method as in claim 1 wherein the new primary key has no relationship to the original table data.

11. A method as in claim 1 wherein the original table has parent and child portions that replicate into respective parent replicate and a child replicate portions.

12. A method as in claim 11 wherein a new primary key field is added to the parent replicate and the child replicate.

13. A method as in claim 11 wherein a new link field is added to the parent replicate and the child replicate.

14. A method as in claim 13 wherein the data value in the new link field in the child portion is removed and stored in the secure location.

15. A method as in claim 13 wherein the data value in the new link field in the parent portion is removed and stored in the secure location.

16. A method as in claim 11 wherein a new primary key is added to the parent replicate and a different new primary key is added to the child replicate.

17. An apparatus for providing data security comprising:
    a storage unit an, for storing an original table;
    a replicate data store, for storing a new primary key, a link field and a replicate of the original;
    table in which a selected removed element of the original table is not stored;
    a secure location, for storing the removed element and a replicate of the new primary key, with no direct linkage between the removed element of the replicate of the original table and the new primary key;
    a connection, to request the new primary key and the link field to reconstruct a data table; and
    a second storage unit to store the reconstructed data table which originated from portions of the replicate data store and at least one element retrieved from the secure location.

18. An apparatus as in claim 17 wherein the original table resides in a database structure.

19. An apparatus as in claim 17 wherein the removed elements are data fields.

20. An apparatus as in claim 19 wherein the removed elements comprise link information.

21. An apparatus as in claim 17 wherein the secure location is an object oriented database with access control attributes.

22. An apparatus as in claim 17 wherein the data elements in the secure location appear as a disjointed set of values.

23. An apparatus as in claim 17 wherein the replicate table is stored in the secure location.

24. An apparatus as in claim 17 wherein the replicate table is stored in a remote location.

25. An apparatus as in claim 17 wherein the replicate table with elements removed is generally accessible.

26. An apparatus as in claim 17 wherein the new primary key has no relationship to the original table data.

27. An apparatus as in claim 17 wherein the original table has parent and child portions that replicate into respective parent replicate and child replicate portions.

28. An apparatus as in claim 27 wherein the new primary key field is added to the parent replicate and the child replicate.

29. An apparatus as in claim 27 wherein a new link field is added to the parent replicate and the child replicate.

30. An apparatus as in claim 29 wherein the data value in the new link field in the child portion is removed and stored in a secure location.

31. An apparatus as in claim 29 wherein the data value in the new link field in the parent portion is removed and stored in a secure location.

32. An apparatus as in claim 27 wherein a new primary key is added to the parent replicate and a different new primary key is added to the child replicate.

* * * * *